(No Model.)
T. LINDBERG.
DEVICE FOR ORNAMENTING TUBES.
No. 359,729.   Patented Mar. 22, 1887.
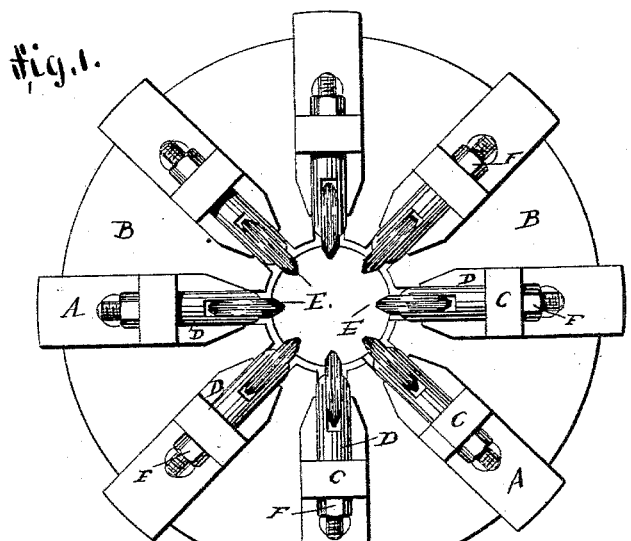
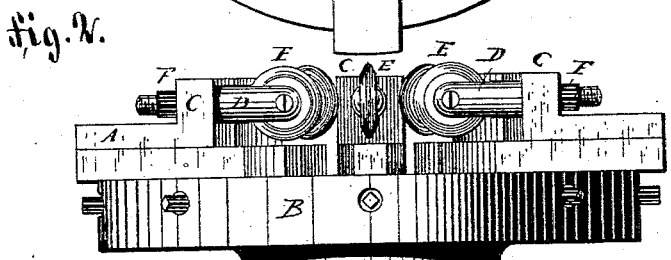
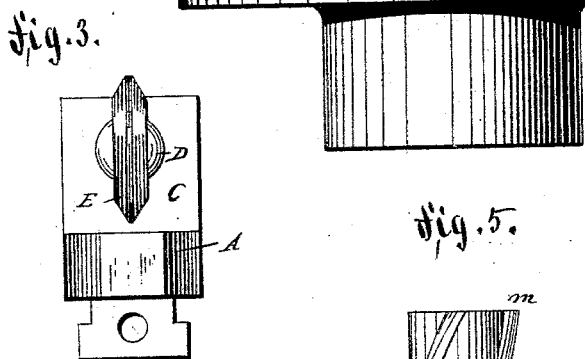
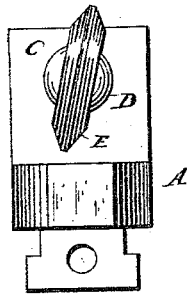
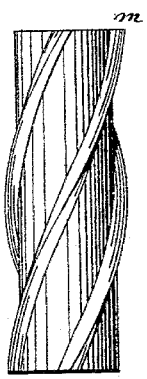
WITNESSES:
INVENTOR
Theodore Lindberg
BY
Goepel & Raegener
ATTORNEYS.

UNITED STATES PATENT OFFICE.

THEODORE LINDBERG, OF BROOKLYN, NEW YORK, ASSIGNOR TO ROBERT S. GOULD, OF EAST ORANGE, NEW JERSEY.

DEVICE FOR ORNAMENTING TUBES.

SPECIFICATION forming part of Letters Patent No. 359,729, dated March 22, 1887.

Application filed September 20, 1886. Serial No. 213,972. (No model.)

*To all whom it may concern:*

Be it known that I, THEODORE LINDBERG, of Brooklyn, in the county of Kings and State of New York, have invented certain new and useful Improvements in Chucks for Making Ornamental Tubes, of which the following is a specification.

The object of my invention is to provide a new and improved chuck for turning or drawing ornamental tubes—that is, tubes provided with grooves or raised parts on their outer surface.

The invention consists in a chuck having an adjustable piece on each jaw, and of rollers pivoted in the adjustable pieces, which rollers are pivoted to the inner ends of the jaws, all as will be fully described and set forth hereinafter, and finally be pointed out in the claims.

In the accompanying drawings, Figure 1 is a face view of my improved chuck for drawing or turning tubes. Fig. 2 is a side view of the same. Figs. 3 and 4 are end views of the jaws, showing the rollers in different positions. Fig. 5 is a side view of an ornamental tube made by means of the chuck.

Similar letters of reference indicate corresponding parts.

A series of sliding jaws, A, are mounted on the disk B, in the well-known manner of mounting the jaws in chucks, screws being provided for shifting the jaws readily. There are various ways and methods of mounting jaws to slide regularly on chucks; but any of these may be used in my improved device, as the means for moving the jaws are independent of my invention, and each jaw is provided with an upwardly-projecting lug, C, in which a forked rod, D, is held, the forked end of the rod being over or above the inner end of the jaw. In each forked rod D a roller, E, is provided, which roller may have a knife-edge, or rounded or milled edge, or which edge may have any other desired contour and cross-section, according to the desired effect to be produced. The other ends of the rods D are preferably screw-threaded and provided with nuts F, for the purpose of locking them in place. In place of the screw and nut, any other device may be used for locking the rods D in place.

As shown in Fig. 1, the planes of the wheels or rollers E are all at right angles to the plane of the disk B, and must remain in this position. For turning longitudinally ribbed or beaded tubes, or for making grooves in said tubes, the chuck is locked in place and the tubes drawn through the same one or more times, the rollers being adjusted nearer to the center of the chuck for each successive drawing until the same is completed. For making spiral tubes, or tubes having spiral ornaments, the planes of the rollers E must be adjusted at a greater or less inclination to the plane of the disk B, according to the desired pitch of the spiral. When the nuts F are loosened, the rods D can be turned on their longitudinal axis until the rollers have the desired inclination, and then the said rods may be locked in place. For making a spiral ornamental tube the tube is held in such a manner that it cannot be revolved on its longitudinal axis and the chuck is revolved, whereby the tube is drawn forward in the direction of its length, the speed of movement of the tube depending on the pitch of the spirals. More or less jaws provided with rollers may be used. The tube may be provided with left or right hand spiral lines, either raised or sunken, whereby diamonds are produced on the face of the tube. By using two flat rollers, or rollers having wide rims close to each other, the metal is pressed inward between the rollers, and a spirally-raised rim is produced on the face of the tube, as shown in Fig. 5.

By using rollers having different-shaped edges any desired cross-section of the tube may be produced.

Having thus described my invention, I claim as new and desire to secure by Letters Patent—

1. A chuck for drawing and turning ornamental tubes, constructed with jaws, on each of which a forked piece is mounted to turn on its longitudinal axis, and on each of which forked pieces rollers are mounted, substantially as shown and described.

2. In a chuck for drawing and turning ornamental tubes, the combination, with jaws having lugs on their upper ends, of a forked piece mounted to turn on its longitudinal axis in each jaw, which forked pieces are screw-threaded at their rear ends and provided with nuts resting against the jaws, and rollers pivoted in the inner ends of the forked pieces, substantially as shown and described.

In testimony that I claim the foregoing as my invention I have signed my name in presence of two subscribing witnesses.

THEODORE LINDBERG.

Witnesses:
OSCAR F. GUNZ,
MARTIN PETRY.